(12) United States Patent
Glavind et al.

(10) Patent No.: US 10,934,998 B2
(45) Date of Patent: Mar. 2, 2021

(54) YAW SENSOR FOR A WIND TURBINE

(71) Applicant: VESTAS WIND SYSTEMS A/S, Aarhus N (DK)

(72) Inventors: Lars Glavind, Randers (DK); Kristian Kiib, Skødstrup (DK); Ib Svend Olesen, Randers (DK); Johnny Nielsen, Svenstrup (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 395 days.

(21) Appl. No.: 16/068,030

(22) PCT Filed: Jan. 10, 2017

(86) PCT No.: PCT/DK2017/050003
§ 371 (c)(1),
(2) Date: Jul. 3, 2018

(87) PCT Pub. No.: WO2017/121433
PCT Pub. Date: Jul. 20, 2017

(65) Prior Publication Data
US 2020/0271094 A1  Aug. 27, 2020

(30) Foreign Application Priority Data
Jan. 13, 2016 (DK) .................................. 201670013

(51) Int. Cl.
*F03D 7/04* (2006.01)
*F03D 17/00* (2016.01)
*F03D 80/80* (2016.01)

(52) U.S. Cl.
CPC ............. *F03D 7/042* (2013.01); *F03D 17/00* (2016.05); *F03D 80/82* (2016.05);
(Continued)

(58) Field of Classification Search
CPC .......... F03D 7/042; F03D 17/00; F03D 80/82; F05B 2240/221; F05B 2270/329; F05B 2270/809
(Continued)

(56) References Cited

U.S. PATENT DOCUMENTS 4,565,929 A * 1/1986 Baskin ...................... F03D 9/25
290/44
9,188,106 B2 * 11/2015 Eriksen ................... F03D 80/00
(Continued)

FOREIGN PATENT DOCUMENTS

CN          201225232 Y     4/2009
CN          201474859 U     5/2010
(Continued)

OTHER PUBLICATIONS

Chinese Office Action for Application No. 2017800064908.X dated May 24, 2019.
(Continued)

*Primary Examiner* — Pedro J Cuevas
(74) *Attorney, Agent, or Firm* — Patterson + Sheridan, LLP

(57) ABSTRACT

A yaw sensor for a wind turbine is described. The yaw sensor comprises a rotary switch, configured to be coupled to a yaw drive gearbox of a wind turbine nacelle, the rotary switch being operable to activate and deactivate an electrical contact in dependence on an amount of yaw rotation of the nacelle relative to a start position. The electrical contact is active at a plurality of first yaw rotation ranges with respect to the start position, and inactive at a plurality of second yaw rotation ranges with respect to the start position, the first and second yaw rotation ranges being interleaved, at least some of the first yaw rotation ranges having different lengths from each other and/or at least some of the second yaw rotation (Continued)

ranges having different lengths from each other. The electrical contact generates an electrical signal when active.

18 Claims, 3 Drawing Sheets

(52) U.S. Cl.
CPC ... *F05B 2240/221* (2013.01); *F05B 2270/329* (2013.01); *F05B 2270/809* (2013.01)

(58) Field of Classification Search
USPC .................................................. 290/44, 55
See application file for complete search history.

(56) References Cited

U.S. PATENT DOCUMENTS

| | | |
|---|---|---|
| 2010/0133825 A1 | 6/2010 | Gao |
| 2010/0209246 A1 | 8/2010 | Migliori |
| 2011/0133455 A1 | 6/2011 | Altenschulte et al. |
| 2011/0142622 A1 | 6/2011 | Hoffmann et al. |
| 2013/0088009 A1 | 4/2013 | Cousineau et al. |
| 2013/0195656 A1* | 8/2013 | Eriksen ............... F03D 80/70 416/1 |
| 2013/0341934 A1* | 12/2013 | Kawanishi ........... B61D 43/00 290/1 A |
| 2019/0048848 A1* | 2/2019 | Glavind ............. F03D 7/0204 |
| 2019/0072069 A1* | 3/2019 | Rask .................. F03D 80/50 |
| 2020/0232446 A1* | 7/2020 | Hawkins ............ F03D 80/70 |

FOREIGN PATENT DOCUMENTS

| | | |
|---|---|---|
| EP | 1683965 A2 | 7/2006 |
| EP | 2189656 A2 | 5/2010 |
| WO | 2017121433 A1 | 7/2017 |

OTHER PUBLICATIONS

Danish Patent and Trademark Office 1st Technical Examination for Application No. PA 2016 70013 dated Aug. 12, 2016.
PCT International Search Report for Application No. PCT/DK2017/050003 dated Apr. 19, 2017.
PCT Written Opinion for Application No. PCT/DK2017/050003 dated Apr. 19, 2017.

* cited by examiner

YAW SENSOR FOR A WIND TURBINE

FIELD OF THE INVENTION

The present invention relates to a yaw sensor for a wind turbine.

BACKGROUND TO THE INVENTION

Wind turbines comprise a fixed tower which stands on the ground or sea bed, and a nacelle which rests on the top of the tower and carries a turbine shaft, a gearbox, a brake, a generator, a blade pitch controller which controls the angle of the turbine blades, and a yaw drive which controls the position of the wind turbine relative to the wind. Turbine blades are mounted to the turbine shaft externally of the nacelle. The turbine blades cause the shaft to rotate under the influence of wind, which in turn drives the generator to generate electrical power. The pitch of the blades is controlled by the blade pitch controller to influence the speed of rotation of the drive shaft in dependence on wind speed. The yaw drive causes the nacelle to slowly rotate at the top of the tower such that the turbine blades are facing into the direction of the prevailing wind, to maintain optimal power output. The yaw drive utilises a wind direction sensor to determine the current wind direction and a yaw sensor comprising an angular encoder which determines the current yaw position of the nacelle. The yaw drive comprises a controller which determines from the information gathered from these sensors a yaw adjustment to align the nacelle with the wind direction.

It will be appreciated that electricity generated from the generator in the nacelle is conveyed down the tower and to an electricity distribution system via an electric cable. It will be further appreciated that if the nacelle continues to rotate in the same direction continuously that eventually any slack in the electric cable will be used up and the electric cable would then snap if the nacelle rotates further. In order to address this, the yaw sensor comprises rotary cam switch, which is coupled to a gearbox of the yaw drive by a pinion gear, and which activates (or deactivates) an electrical contact when the drive of the cam switch has rotated to a predetermined (safe end stop) position in either direction from a central position. It will be appreciated that a predetermined position of the cam switch will correspond to a predetermined yaw position (which can generally be expected to be a value of greater than 360°—that is, multiple rotations of the nacelle). For example, the nacelle may be able to safely rotate 10 times about the axis of its tower in either direction without damaging the electric cable, in which case the cam switch will activate (or deactivate) the electric contact at a cam position which corresponds to a yaw rotation of 3600° of the nacelle in either direction. In this example the cam switch may rotate once for 20 turns of the nacelle (that is, half a turn of the cam switch in each direction from a start position will activate (or deactivate) the electric contact. When the electrical contact is activated (or deactivated), this triggers the yaw drive to rotate the nacelle back in the opposite direction (by 10 turns in this example) to its central rest position or to make an emergency stop of the turbine pending maintenance to correct the problem.

The yaw sensor may be connected to a yaw bearing from the yaw drive by a pinion gear, and the angular encoder may be connected to a shaft in the yaw sensor either directly or via a gear wheel. After the angular encoder, a gear may be provided before the cam switch. Accordingly, there are several transmissions which may potentially fail, either partly or completely, which might stop or at least inhibit the cam switch and/or the angular encoder from working. In order to address this, in addition to activating (or deactivating) the electrical contact at the end stop positions, the cam switch may also generate a simple uniform yaw pulse at regular yaw positions. This constitutes an alive signal which indicates that the transmission path between the yaw drive gearbox and the cam switch is functioning. If no yaw pulse is generated as the nacelle is rotated by the yaw drive then it may be assumed that the transmission path has failed, and the turbine may need to be deactivated pending maintenance to correct the problem. It will be appreciated that both the angular encoder and the cam switch of the yaw sensor provide (different) information about yaw position of the nacelle. In particular, the angular encoder indicates absolute yaw position, while the cam switch indicates when the nacelle has reached an end stop position, and also indicates (via the uniform yaw pulse) that the nacelle is rotating, which latter information can be used in combination with the knowledge that the yaw drive is currently driving rotation of the nacelle to confirm that the cam switch is functioning and that the transmission path between the yaw drive gearbox and the cam switch is functioning.

It is against this background that the invention has been devised.

SUMMARY OF THE INVENTION

In a first aspect, the invention provides a yaw sensor for a wind turbine, the yaw sensor comprising:
  a rotary switch, configured to be coupled to a yaw drive gearbox of a wind turbine nacelle, the rotary switch being operable to activate and deactivate an electrical contact in dependence on an amount of yaw rotation of the nacelle relative to a start position;
  wherein the electrical contact is active at a plurality of first yaw rotation ranges with respect to the start position, and inactive at a plurality of second yaw rotation ranges with respect to the start position, the first and second yaw rotation ranges being interleaved, at least some of the first yaw rotation ranges having different lengths from each other and/or at least some of the second yaw rotation ranges having different lengths from each other; and
  wherein the electrical contact generates an electrical signal when active.

The yaw sensor may comprise a controller operable to receive electrical signals from the electrical contact and to estimate a current yaw rotation of the nacelle relative to the start position based on pulse lengths of the received electrical signal or gaps between pulses of the received electrical signal.

The yaw sensor may comprise an absolute encoder coupled to the yaw drive gearbox, the absolute encoder being operable to determine a current yaw position of the nacelle. The controller may be operable to calculate a current estimated yaw position from the estimated current yaw rotation based on the rotary switch, and to compare the current yaw position determined by the absolute encoder with the estimated current yaw position. The controller may be operable to generate a validation signal in dependence on whether the current yaw position determined by the absolute encoder substantially matches the current yaw position estimated.

The controller may be operable to determine a direction in which the nacelle is rotating based on the respective lengths and order of occurrence of two or more received pulses of electrical signals or gaps between the pulses.

A pattern of first and second yaw rotation ranges in a first direction of rotation with respect to the start position may be different to a pattern of first and second yaw rotation ranges in a second, opposite, direction of rotation with respect to the first position.

The first yaw rotation ranges may progressively increase in length from a first rotational position to one side of the start position to a second rotational position to the other side of the start position. The first rotational position may be a plurality of rotations of the nacelle in a first rotational direction with respect to the start position and the second rotational position may be a plurality of rotations of the nacelle in a second rotational direction with respect to the start position. The first and second rotational positions may be proximate safe end stop positions of the nacelle.

The controller may be operable to cause the yaw drive to rotate the nacelle back to or towards its start position when the amount of rotation with respect to the start position reaches a first predetermined threshold value. The rotary switch may be operable to activate or deactivate a further electrical contact when the amount of rotation with respect to the start position reaches a second predetermined threshold value. The first threshold value may be either substantially the same as or less than the second threshold value.

The controller may be operable to calculate the length of the pulses and/or gaps between pulses based on the received electrical signals and yaw drive information comprising a duration of rotation of the nacelle and a speed of rotation of the nacelle. The yaw drive information may also comprise a direction in which the nacelle has been drive to rotate.

In a second aspect, the invention provides a yaw drive for a wind turbine comprising a yaw sensor as described above.

In a third aspect, the invention provides a wind turbine comprising a yaw sensor as described above.

DETAILED DESCRIPTION OF EMBODIMENTS OF THE INVENTION

Figure 1:
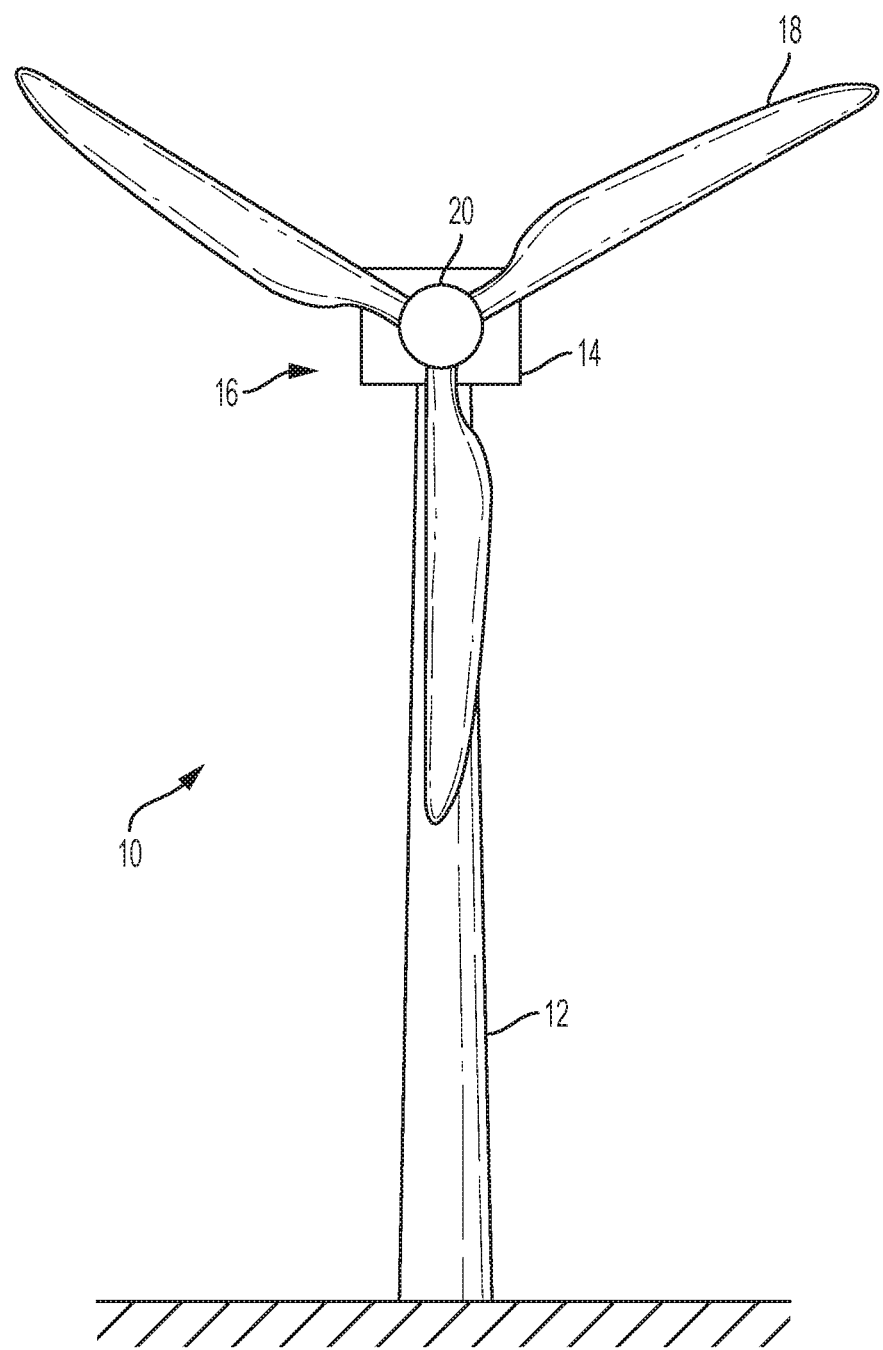
FIG. 1 is a schematic view of a wind turbine system.

FIG. 1 shows a wind turbine 10 comprising a tower 12 supporting a nacelle 14 to which a rotor 16 is mounted. The rotor 16 comprises a plurality of wind turbine blades 18 that extend radially from a central hub 20. In this example, the rotor 16 comprises three blades 18. As discussed above, the pitch of the wind turbine blades 18 can be adjusted by a blade pitch controller (not shown), while the yaw of the nacelle 14 can be adjusted by a yaw drive (not shown) to face generally into the wind.

Figure 2:
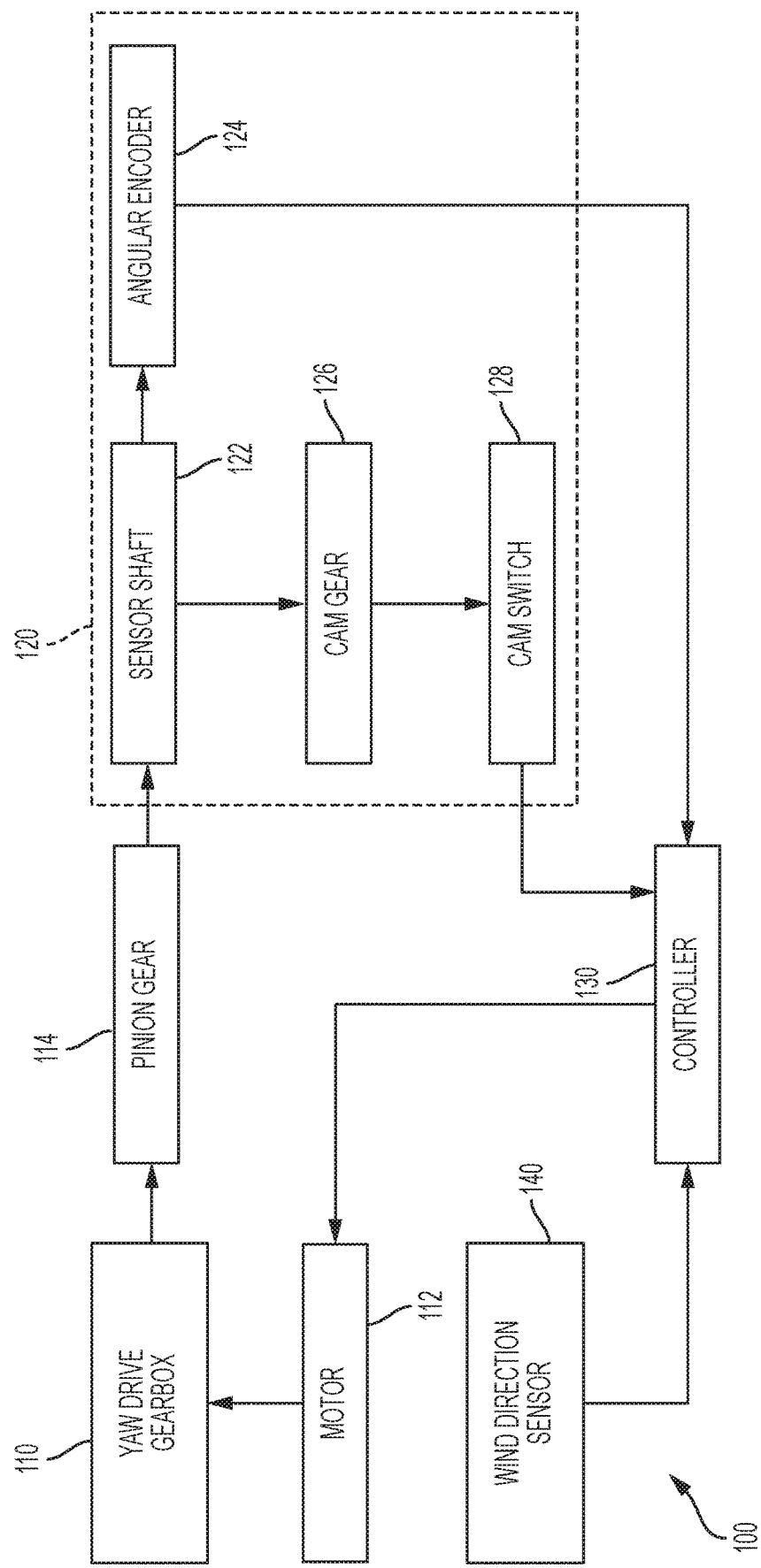
FIG. 2 is a schematic functional diagram of a yaw drive and sensor.

FIG. 2 shows the functional components and interrelationships of a yaw drive 100. The yaw drive 100 comprises a yaw drive gearbox 110 which is connected on the one hand to a rotating mount (not shown) on which the nacelle 14 is disposed, and on the other hand to a motor 112 which rotates a shaft for driving the rotation of the rotating mount via the gearbox 110. A yaw sensor 120 is provided, which is coupled to the yaw drive gearbox 110 (for example the yaw bearing) by way of a pinion gear 114. The yaw sensor comprises an angular (absolute) encoder 124 and a mechanical cam switch 128. As the nacelle 14 is rotated by the action of the motor 112 and the gearbox 110, the pinion gear 114 also rotates, and the rotation of the pinion gear 114 in turn rotates a sensor shaft 122 of the yaw sensor 120. The angular encoder 124 is coupled to the sensor shaft 122, either directly or by way of another gear (not shown), and is able to track the rotation of the shaft and output a signal indicative of the current rotational position of the nacelle 14. The cam switch 128 is also coupled to the sensor shaft 122, in this case by way of a cam gear 126. It will be appreciated that if the pinion gear 114 fails, neither the absolute encoder 124 nor the cam switch 128 will function. Moreover, if the coupling between the angular encoder 124 and the sensor shaft 122 fails, the angular encoder 124 will not function, but the cam switch 128 should still function, while if the cam gear 126 fails then the cam switch 128 will not function by the angular encoder 124 should still function. In other words, there are a number of transmission components which may potentially fail.

A controller 130 is provided which controls the yaw drive by switching the motor 112 on and off (and setting its direction of rotation, to permit rotation of the nacelle 14 in either direction). The controller 130 receives an indication of current wind direction from a wind direction sensor 140, and also receives a current yaw position of the nacelle 14 from the angular encoder 124. The controller 130 is able to determine what adjustments, if any, are required to the yaw of the nacelle 14 in order to face the turbine blades 18 into the wind. This can be determined based on a measured relative wind direction. If adjustment is required then the controller 130 controls the motor 112 to rotate the nacelle 114 by a predetermined amount to give effect to the adjustment. Generally, the speed of rotation can be expected to be fixed, and a desired amount of rotation is achieved by switching the motor 112 on for a period of time which will result in rotation by that desired amount. In other words, for a fixed speed of rotation and a known motor activation duration, an amount of rotation of the nacelle obtained is substantially predictable. The yaw (nacelle) position as determined by the angular encoder 124 may be used to give an absolute wind direction which can be used to determine if the wind is coming from a direction which should cause the turbine to be derated or shut down. It is also used for determining the yawing speed. In addition to the yaw position indicated by the angular encoder 124, the cam switch 128 also provides one or more signals to the controller 130.

The cam switch 128 may be of a structurally conventional nature, with electrical contacts which are opened and closed by round disks, or "cams". The cams are provided with either notches or fingers which allow the contacts to be activated (switch closed to permit a flow of electricity) and deactivated (switch opened to inhibit a flow of electricity) at desired rotational positions of the cam. A spring bias may be used to bias a following member against the cam, with the following member holding the contact closed wherever the cam is notched and the member drops down into the notch, and holding the contact open wherever it is not notched. It will be appreciated that the opposite could apply, with the contact being open whenever the cam is notched, and closed whenever it is not notched. Similarly, where fingers are used instead of notches then the following member will be urged away from the axis of the cam whenever it encounters a finger. More generally, the cam may have (relatively) raised and lowered circumferential portions, with switching of the contacts being controlled as the following member encounters and follows the raised and lowered circumferential portions. The cam switch 128 may comprise a plurality of cams, all co-mounted to the same shaft and having raised and lowered circumferential portions at desired locations, and controlling its own independent contact based on the position of the raised and lowered circumferential portions.

In the context of the present technique, a position of a raised (or lowered) circumferential portion on a particular cam can be set to activate or deactivate a contact at a desired rotational position of the cam (and thus of the nacelle 14, which is coupled to a shaft of the cam switch 128 via the pinion gear 114, sensor shaft 122 and cam gear 126). It will be appreciated that, in view of the fact that a single rotation of the cam may correspond to multiple rotations of the nacelle 14, the rotational position of the nacelle 14 at which the cam switch activates or deactivates may be greater than 360°. Similarly, a length of a raised or lowered portion on the cam can be set to correspond to a particular angular range of the cam (and thus of the nacelle 14). One of the cams may comprise a single notch or finger which is positioned to correspond to a safe stop position of the nacelle 14 (for example 10 rotations of the nacelle 14). In this case, a start position of the cam, corresponding to a start position of the nacelle 14, may be at the opposite side of the cam from the notch or finger, and a half rotation of the cam (to reach the notch or finger from the start position) will correspond to the number of rotations (full or partial) which the nacelle 14 can turn safely in either direction. If for example the nacelle 14 can rotate about the axis of the tower 12 a maximum of 10 times safely, then each rotation of the nacelle 14 in a particular direction will rotate the cam 10% of the way from the cam start position towards the notch or finger. Whichever direction the nacelle 14 turns, the cam will reach the notch or finger after 10 turns from its start position, which will cause an electrical signal to be generated by the contact of the cam switch 128 and be provided to the controller 130 as a safe end stop signal. The controller 130 is responsive to this safe end stop signal to inhibit further rotation of the nacelle 14 in that direction, and to rotate the nacelle 14 (and thus the cam) back to its start position.

Another of the cams may comprise a series of raised and lowered portions distributed about its circumference which cause a contact to be activated and deactivated as the nacelle 14 (and thus the cam) rotates. The activation and deactivation of this contact generates an alive signal which can be provided to the controller 130 to indicate that the cam switch 128 is still functioning. In particular, the controller 130 knows that the nacelle 14 is rotating based on either or both of the fact that it is triggering the motor 112 to drive rotation of the nacelle 14 and based also on the signal received from the angular encoder 124. If the alive signal received from the cam switch 128 does not vary as the nacelle 14 rotates, the controller is able to infer a problem with either the cam switch, or the transmission chain between the gearbox 110 and the cam switch 128. In this case, the controller 130 cannot safely rely on the safe end stop signal from the cam switch 128, and may inhibit the yaw drive from rotating the nacelle 14 until the problem has been rectified by an engineer. Conventionally, the raised and lowered portions of the cam are uniform in circumferential length, giving rise to a uniform synchronous alive signal as the nacelle 14 (and the cam) rotates. However, in the present technique the raised and lower portions of the cam vary in length. As a result, pulse lengths and gap lengths with respect to amount of rotation from the cam start position (and thus with respect to an amount of rotation of the nacelle 14 from its start position) also vary in length, as can be seen in FIG. 3.

Figure 3:
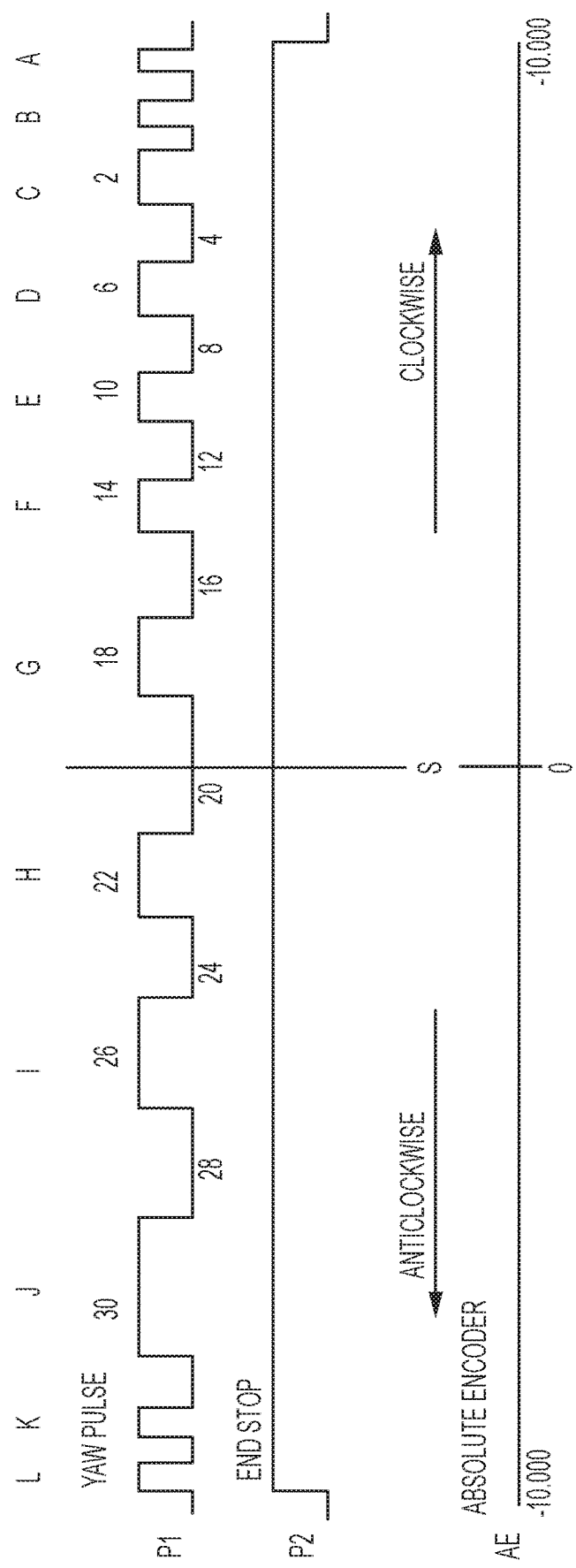
FIG. 3 is a schematic view of an asynchronous pulse signal generated by the yaw sensor of FIG. 2.

Referring now to FIG. 3, the top part thereof shows a yaw pulse (effectively encoded onto an alive signal) P1, the middle part shows an end stop signal P2, and the bottom part shows an absolute encoder output AE. A start position S is indicated at the middle of the diagram, which can be seen from the bottom part of FIG. 3 to correspond to an absolute encoder value of zero. In FIG. 3, the absolute encoder is shown to measure from −10 (10 complete revolutions of the nacelle 14 in an anticlockwise direction) to +10 (10 complete revolutions of the nacelle 14 in a clockwise direction). The end stop signal can be seen to take on a high value within this range, and a low value outside of this range (extreme left and right positions of FIG. 3). It will therefore be appreciated that when the controller 130 receives a low value end stop signal, it inhibits further rotation of the nacelle 14 and resets the position of the nacelle 14 by rotating it back to the start position S. The alive signal comprises a series of pulses and gaps extending from one end of the permitted range of rotation of the nacelle 14 to the other end. At each end, a pair of pulses (A, B at one end, corresponding to the maximum clockwise rotation of the nacelle 14, and L, K at the other end, corresponding to the maximum anticlockwise rotation of the nacelle 14) is provided which indicates the proximity of the safe end stop position. This can be used as a backup to the end stop signal should the latter fail for any reason. The pulse pairs A, B and L, K can be readily recognised by the controller due to their short duration compared with the other pulses, and due to their proximity to each other. The pulses A, B, L, K are at substantially the same angular position on the cam switch 128 as the safe end stop position of the end stop signal, but could if desired be closer to the start position than this, with the result that the signal P1 would be used as the trigger to rotate the nacelle back to or towards its start position, rather than relying on the signal P2. In this case, the signal P2 would effectively be a fail-safe for the signal P1. The remaining pulses C, D, E, F, G, H, I and J gradually increase in length, with the pulse C having a length of 2° (of the circumference of the cam switch 128), rising to a length of 30° for the pulse J. It will be appreciated that if the controller 130 experiences a series of pulses which increase in length with each pulse then this indicates that the nacelle 14 is rotating anticlockwise, while if the controller 130 experiences a series of pulses which decrease in length with each pulse then this indicates that the nacelle 14 is rotating clockwise. The same principle can be applied to the gaps between pulses, which can be seen in FIG. 3 to increase in size in the same way as the pulses. In an alternative embodiment the pulses may increase in size in a particular rotation direction while the gaps decrease in size in that same rotational direction. It can also be seen from FIG. 3 that the pattern of pulses obtained when rotating anticlockwise from the start position is different to the pattern of pulses obtained when rotating clockwise from the start position, making it possible to rapidly identify a direction of rotation.

It will be appreciated from FIG. 3 that it is possible to estimate the yaw of the nacelle 14 by determining the length of a pulse (or a gap between pulses) in the alive signal. It should be noted that the alive signal is effectively digital, indicating either that the contact is currently active or inactive. It does not in itself indicate the current rotational position of the cam (or of the nacelle 14). However, based on observing the time at which transition points to and from a pulse occur, or the time at which transition points to and from a gap between two pulses occur, and by noting an expected amount of rotation between those times, a length of the pulse can be inferred. The expected amount of rotation may be based on the amount of rotation the controller 130 has driven the motor 112 to apply, or in some circumstances may be based on information from the angular encoder 124. In the former case, if the speed of rotation of the nacelle 14 is fixed, and the controller 130 tracks the duration and direction of rotation by the motor 112, then the amount of rotation can be inferred. It will be appreciated from the above that the same angular rotation of the nacelle 14 will give rise to different pulse lengths at different distances from the start position of the nacelle 14. The controller 130 is aware of the correspondence between pulse length and angular distance from the start position of the nacelle 14 (in each rotational direction), and therefore is able to infer an estimate of the yaw position from the calculated pulse length.

It will be appreciated that the nacelle 14 may oscillate in both rotational directions to track the wind direction. The controller 130 tracks the overall (net) amount of rotation between the two transition points in order to determine the pulse length. If between a first transition point (for example a transition from a gap to a pulse) and a second transition point (for example a transition from a pulse to a gap) the motor 12 is driven to drive rotation of the nacelle 14 by an amount which corresponds to a 15° turn of the cam switch 128 anticlockwise, then 5° clockwise, then 20° anticlockwise, then the net rotation of the cam switch will be 30° (15−5+20=30) anticlockwise. Referring to FIG. 3, it can be seen that the pulse J has a pulse length of 30° of the cam switch circumference, enabling the controller 130 to determine the yaw position as corresponding to 150° (if the 30° rotation was in the clockwise direction then the yaw position would be determined as 120°). In other words, the pulses referred to above are not pulses with respect to time, but are effectively pulses with respect to circumferential position of the cam switch, and by implication with respect to the amount of rotation of the nacelle 14 with respect to its start position. In FIG. 3, the angles shown are the angular distances about the cam switch 128. These can however be converted if necessary into a yaw position of the nacelle 14 (that is, within a 360° range, or within a range of ±180°). For example, if one half-rotation (180°) of the cam switch 128 corresponds to 10 rotations of the nacelle 14, then the 150° angular position of the cam switch 128 will correspond to a yaw position of 6° anticlockwise (each full rotation of the nacelle corresponds to a 18° rotation of the cam switch 128; 150° therefore constitutes 8 full rotations of the nacelle 14 and a 6° part rotation of the nacelle 14).

The controller 130 is able to compare the yaw position estimated in this way from the cam switch pulses with the yaw position measured by the rotary encoder 124, to supervise if the encoder yaw position signal is valid and verify the absolute position of the nacelle 14. In the case of a discrepancy, the yaw drive can be inhibited from further rotating the nacelle 14 until an engineer has corrected the problem (which could be a problem with either or both of the rotary encoder 124 and the cam switch 128, or with the transmission components). A validation signal can be generated to confirm that the encoder yaw position is valid, or in the alternative to indicate that there is a discrepancy between the encoder yaw position and the cam switch yaw position.

If necessary, the yaw pulse generated by the cam switch 128 can also be used to define a reset point. More particularly, a position to which the nacelle 14 returns to on reset (when it has reached one or other of the safe stop points) can be defined and controlled using the yaw pulse. In particular, the controller 130 may rotate the nacelle 14 back from the safe stop point until the cam switch 128 generates a signal of a length which corresponds to the desired nacelle 14 position.

It will be understood that, with the present technique, two electrical contacts are preferably provided as shown on FIG. 3. One of these contacts, generating the pulse signal P2, is only active if an end stop is reached. This safety contact is connected to a safety system that will most likely simply shut down the turbine if activated. The new contact is not connected to the safety system but to the turbine controller. The signal P1 generated by the new contact is used to monitor the safety contact and the yaw encoder by giving an alive signal, a rough absolute yaw position and to trigger untwisting the cable before the safety contact is activated and the turbine is shut down. In normal operation it is the yaw encoder that is used to determine when to untwist the cables.

While embodiments of the invention have been shown and described, it will be understood that such embodiments are described by way of example only and it will be appreciated that features of different embodiments may be combined with one another. Numerous variations, changes and substitutions will occur to those skilled in the art without departing from the scope of the present invention as defined by the appended claims. Accordingly, it is intended that the following claims cover all such variations or equivalents as fall within the spirit and the scope of the invention.

The invention claimed is:

1. A yaw sensor for a wind turbine, the yaw sensor comprising:
   a rotary switch, configured to be coupled to a yaw drive gearbox of a wind turbine nacelle, the rotary switch being operable to activate and deactivate an electrical contact in dependence on an amount of yaw rotation of the nacelle relative to a start position;
   wherein the electrical contact is active at a plurality of first yaw rotation ranges with respect to the start position, and inactive at a plurality of second yaw rotation ranges with respect to the start position, the first and second yaw rotation ranges being interleaved, at least some of the first yaw rotation ranges having different lengths from each other and/or at least some of the second yaw rotation ranges having different lengths from each other; and
   wherein the electrical contact generates an electrical signal when active.

2. A yaw sensor according to claim 1, further comprising:
   a controller operable to receive electrical signals from the electrical contact and to estimate a current yaw rotation of the nacelle relative to the start position based on pulse lengths of the received electrical signal or gaps between pulses of the received electrical signal.

3. A yaw sensor according to claim 2, further comprising:
   an absolute encoder coupled to the yaw drive gearbox, the absolute encoder being operable to determine a current yaw position of the nacelle;
   wherein the controller is further operable to calculate a current estimated yaw position from the estimated current yaw rotation, and to compare the current yaw position determined by the absolute encoder with the estimated current yaw position.

4. A yaw sensor according to claim 3, wherein the controller is further operable to:
   generate a validation signal in dependence on whether the current yaw position determined by the absolute encoder substantially matches the current yaw position estimated based on the rotary switch.

5. A yaw sensor according to claim 2, wherein the controller is further operable to:
   determine a direction in which the nacelle is rotating based on the respective lengths and order of occurrence of two or more received pulses of electrical signals or gaps between the pulses.

6. A yaw sensor according to claim 2, wherein the controller is further operable to:
   cause the yaw drive to rotate the nacelle back to or towards its start position when the amount of rotation with respect to the start position reaches a first predetermined threshold value.

7. A yaw sensor according to claim 6, wherein the rotary switch is further operable to:
   activate or deactivate a further electrical contact when the amount of rotation with respect to the start position reaches a second predetermined threshold value.

8. A yaw sensor according to claim 7, wherein the first threshold value is either substantially the same as or less than the second threshold value.

9. A yaw sensor according to claim 1, wherein a pattern of first and second yaw rotation ranges in a first direction of rotation with respect to the start position is different to a pattern of first and second yaw rotation ranges in a second, opposite, direction of rotation with respect to the first position.

10. A yaw sensor according to claim 1, wherein the first yaw rotation ranges progressively increase in length from a first rotational position to one side of the start position to a second rotational position to the other side of the start position.

11. A yaw sensor according to claim 10, wherein the first rotational position is a plurality of rotations of the nacelle in a first rotational direction with respect to the start position and the second rotational position is a plurality of rotations of the nacelle in a second rotational direction with respect to the start position.

12. A yaw sensor according to claim 11, wherein the first and second rotational positions are proximate safe end stop positions of the nacelle.

13. A yaw sensor according to claim 1, wherein the controller is further operable to:
   calculate the length of the pulses and/or gaps between pulses based on the received electrical signals and yaw drive information comprising a duration of rotation of the nacelle and a speed of rotation of the nacelle.

14. A yaw sensor according to claim 13, wherein the yaw drive information comprises a direction in which the nacelle has been driven to rotate.

15. An apparatus, comprising:
   a yaw drive gearbox; and
   a yaw sensor, comprising:
      a rotary switch, coupled to the yaw drive gearbox of a wind turbine nacelle, the rotary switch being operable to activate and deactivate an electrical contact in dependence on an amount of yaw rotation of the nacelle relative to a start position;
      wherein the electrical contact is active at a plurality of first yaw rotation ranges with respect to the start position, and inactive at a plurality of second yaw rotation ranges with respect to the start position, the first and second yaw rotation ranges being interleaved, at least some of the first yaw rotation ranges having different lengths from each other and/or at least some of the second yaw rotation ranges having different lengths from each other; and
      wherein the electrical contact generates an electrical signal when active.

16. The apparatus according to claim 15, further comprising:
   a controller operable to receive electrical signals from the electrical contact and to estimate a current yaw rotation of the nacelle relative to the start position based on pulse lengths of the received electrical signal or gaps between pulses of the received electrical signal.

17. A wind turbine, comprising:
   a tower;
   a nacelle disposed on the tower;
   a yaw drive gearbox disposed on the tower; and
   a yaw sensor, comprising:
      a rotary switch, coupled to the yaw drive gearbox of a wind turbine nacelle, the rotary switch being operable to activate and deactivate an electrical contact in dependence on an amount of yaw rotation of the nacelle relative to a start position;
      wherein the electrical contact is active at a plurality of first yaw rotation ranges with respect to the start position, and inactive at a plurality of second yaw rotation ranges with respect to the start position, the first and second yaw rotation ranges being interleaved, at least some of the first yaw rotation ranges having different lengths from each other and/or at least some of the second yaw rotation ranges having different lengths from each other; and
      wherein the electrical contact generates an electrical signal when active.

18. The wind turbine according to claim 17, further comprising:
   a controller operable to receive electrical signals from the electrical contact and to estimate a current yaw rotation of the nacelle relative to the start position based on pulse lengths of the received electrical signal or gaps between pulses of the received electrical signal.

* * * * *